United States Patent [19]

Dall'Aglio

[11] 4,417,400

[45] Nov. 29, 1983

[54] GAUGE FOR CHECKING LINEAR DIMENSIONS OF MECHANICAL PIECES

[75] Inventor: Carlo Dall'Aglio, Volta Reno di Argelato, Italy

[73] Assignee: Finike Italiana Marposs S.p.A., S. Marino di Bentivoglio, Italy

[21] Appl. No.: 283,876

[22] Filed: Jul. 16, 1981

[30] Foreign Application Priority Data

Jul. 22, 1980 [IT] Italy .................................. 3478 A/80

[51] Int. Cl.³ .............................................. G01B 7/02
[52] U.S. Cl. .................................................. 33/172 E
[58] Field of Search ............. 33/172 E, 172 B, 169 R, 33/171, 170, 148 H, 174 L, 169 F

[56] References Cited

U.S. PATENT DOCUMENTS

| 3,122,838 | 3/1964 | Uhlig | 33/172 B |
| 3,368,283 | 2/1968 | Vasseur | 33/169 R |
| 3,812,590 | 5/1974 | Nigg et al. | 33/172 E |
| 4,074,438 | 2/1978 | Takeda | 33/172 E |

OTHER PUBLICATIONS

Pamphlet Tesa–Duotast available at European Machine Tool Exposition (Oct. 10–18, 1979, Milan).

Primary Examiner—William D. Martin, Jr.
Attorney, Agent, or Firm—Stevens, Davis, Miller & Mosher

[57] ABSTRACT

A gauge for the dimensional checking of mechanical pieces comprises an outer casing, an armset fixed to the casing and having a gauging arm movable along two opposite directions, a feeler carried by the gauging arm for contacting the piece to be checked, a limiting device for adjustably limiting the displacements of the gauging arm along the directions, a spring cooperating with the gauging arm for urging the feeler against the piece, and a device for adjusting the force applied by the spring. The limiting device includes a member, fixed to the casing, which defines a first abutment surface for limiting the displacements of the gauging arm along one of the directions, and a screw passing through the hole of the gauging arm. The screw is coupled to the member and defines a second abutment surface, adjustable with respect to the first abutment surface. The device for adjusting the force applied by the spring has a movable element cooperating with the member for permitting adjustment of the force applied by the spring while preventing torsion of the spring.

10 Claims, 3 Drawing Figures

GAUGE FOR CHECKING LINEAR DIMENSIONS OF MECHANICAL PIECES

The present invention relates to a gauge for the dimensional checking of mechanical pieces, including support means; a gauging arm defining a longitudinal axis, the gauging arm being connected to the support means and having the possibility of effecting measurement displacements, substantially about an axis perpendicular to the longitudinal axis; detection means adapted to detect the position of the gauging arm; and limiting means for limiting in an adjustable way the displacements of the gauging arm.

Gauges are already known which check the linear dimensions of mechanical pieces that include a support, gauging arm which is movable with respect to the support along two opposite measuring directions, and adjustable devices to limit the arm movements in the two measuring directions.

These known gauges present some drawbacks such as considerable layout dimensions, poor accessibility to their interior and difficulties in adjusting the limiting devices.

The object of the present invention is to provide an improved gauge adapted to have very small layout dimensions and in which it is possible to adjust the limits of the gauging arm displacements in a very simple way without there being any problems insofar as access to the interior is concerned, in order to accomplish adjustment operations without any need to disassemble essential parts of the gauge.

This object is attained through a gauge of the type outlined at the beginning of this description wherein, according to the invention, the limiting means include a member fixed to the support means and having an abutment surface adapted to abut against a first section of the gauging arm to limit displacements along a first direction and an element fixed to the member in an adjustable way in a direction substantially perpendicular to the longitudinal axis and to the axis perpendicular to the longitudinal axis, this element having an abutment surface adapted to cooperate with a second section of the arm, opposite to the first section, in order to limit the arm displacements in the opposite direction with respect to the first.

In order that the invention may be clearly understood and readily carried into effect the same is now described with reference to the accompanying drawings, given by way of non-limiting example, in which.

Figure 1:
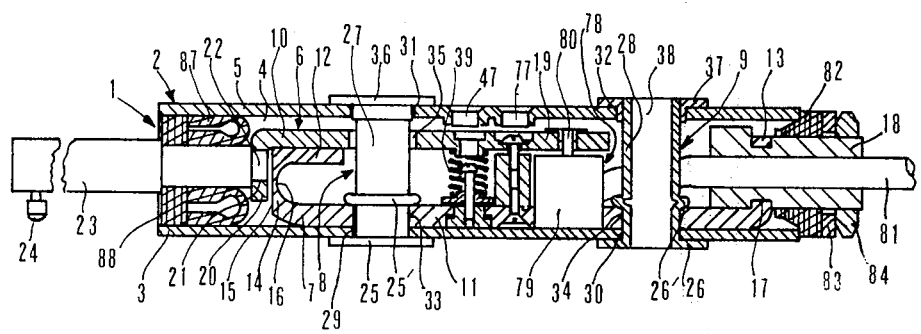
FIG. 1 is a vertical sectional view of a gauge according to the preferred embodiment of the invention.
Figure 2:
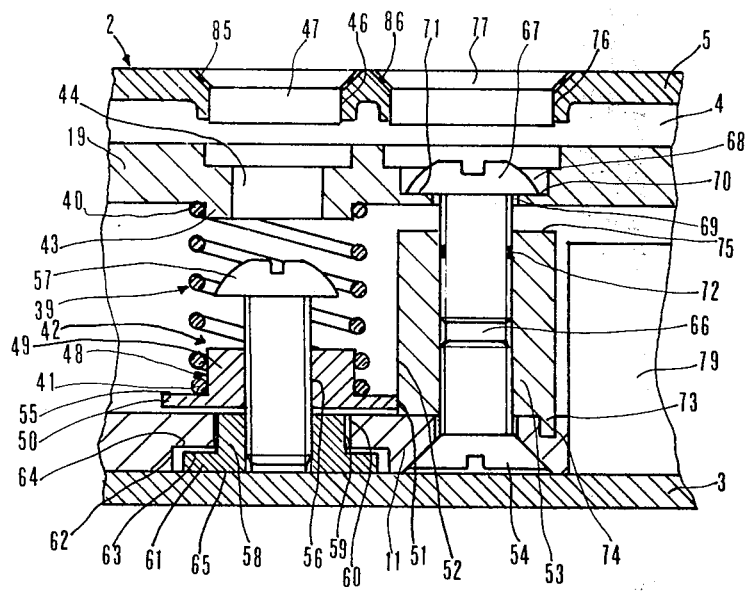
FIG. 2 is an enlarged partly cut-away detail of the gauge shown in FIG. 1.
Figure 3:
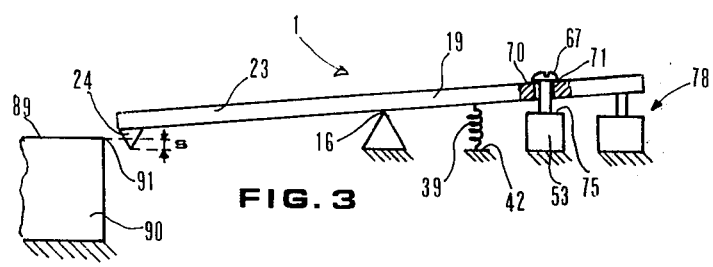

FIG. 3 schematically shows the functioning principle of the gauge shown in FIGS. 1 and 2.

With reference to FIGS. 1 and 2, gauge 1 includes a support means comprising an outer casing 2, consisting of a stainless steel tubular section commercially available on the market. The tubular section has a cross-section with a substantially square perimeter.

Outer casing 2 has walls, three of which, 3, 4 and 5, are shown in the drawings, with internal faces broached in such a way as to be perfectly plane and parallel two by two.

Inside casing 2 there is arranged an armset 6. Armset 6 includes a elongated base element 7, fixed to wall 3 by means of two tubular rivets 8 and 9, as well as an element 10 connected to element 7.

Base element 7 is made of bent sheet steel for springs and includes an intermediate portion 11, that is parallel to the internal face of wall 3, an end portion 12 bent in a direction parallel to intermediate portion 11 and an end wing 13.

End portion 12 is joined to intermediate portion 11 by means of a portion 14 lightened by means of a plane chamfer 15 in order to define a fulcrum 16 with an axis of rotation substantially perpendicular to the plane of FIG. 1. End portion 12 can perform limited rotational movements about fulcrum 16, with respect to intermediate portion 11.

End wing 13 extends in a direction substantially perpendicular with respect to the direction of intermediate portion 11 and defines a lateral opening 17 which houses a section of a cable-clamp 18.

Element 10 is made of bent sheet steel for springs and includes a portion 19 that is parallel to portion 12 and to the axis of rotation defined by fulcrum 16 and a wing 20. Portion 19 is welded to portion 12. Wing 20 is perpendicular to portion 19, and defines a hole 21 in which there is inserted an end 22 of a movable gauging arm 23 that carries, at its other end, a feeler 24 adapted to touch mechanical parts to be checked.

Rivets 8 and 9 have annular heads 25 and 26 in abutment with the external face of wall 3 and tubular stems 27 and 28 inserted in holes 29, 30, 31 and 32 of casing 2 and in holes 33, 34 and 35 of armset 6. After riveting, rivets 8 and 9 have second annular heads 25' and 26' that, together with heads 25 and 26 and the portions of stems 27 and 28 connecting heads 25, 25' and 26, 26', respectively, clamp base element 7 of armset 6 to wall 3. Hole 35 matches with tubular stem 27 with some radial play adapted to allow portion 19 to rotate about fulcrum 16 during the measurement displacements of feeler 24. Substantially, owing to the fact that portion 19 is fixed to gauging arm 23, it can be considered as part of the gauging arm.

In the portions of the tubular stems 27 and 28 that protrude from wall 5 there are inserted tubular caps 36 and 37 that pass through holes 31 and 32 and are in abutment with the outer face of wall 5.

Between annular heads 25, 26 and the external face of wall 3, between tubular caps 36, 37 and the external face of wall 5 and between caps 36 and 37 and tubular stems 27 and 28 there is spread an epoxy resin adhesive that has the purpose of ensuring an efficient connection of the matched parts and also that of preventing humidity from entering inside casing 2 through holes 29, 30, 31 and 32.

When the assembling has been accomplished, the outside faces of annular heads 25 and 26 of tubular caps 36 and 37 and the ends of stems 27 and 28 are ground so that they lie in two plane and parallel surfaces.

Rivets 8 and 9 and caps 36 and 37 define two holes transversally passing through casing 2, only one of which, 38, is shown in FIG. 1, that enable clamping the gauge to an external support, not shown in the drawings, by means of a clamping device, also not shown.

A helical spring 39, defining a geometrical axis substantially perpendicular to portions 11 and 19, has a first end 40 in abutment with portion 19 and a second end 41 cooperating with an adjustment device 42 that serves to adjust the contact force applied by spring 39 to element 10 and consequently to gauging arm 23 connected to element 10. Portion 19 has a cylindrical projecting part 43, with generating lines parallel to the axis of spring 39, that transversally positions spring end 40 and a hole 44, that is substantially coaxial to spring 39.

Cylindrical projecting part 43 forms a single piece together with element 10, and is obtained by a semi-cutting operation.

External wall 5 has a hole 46, tapped by a screw 47, in correspondence to hole 44.

Adjustment device 42 includes a movable element consisting of a cap 48 with a cylindrical portion 49 that has generating lines that are parallel to the axis of spring 39, and a flange 50. Flange 50 has a lateral plane surface 51 in abutment with a lateral face 52 of a member, i.e. a stanchion 53, having the shape of a parallelpipedon. Stanchion 53 is fixed to intermediate portion 11 by means of a screw 54.

End 41 of spring 39 abuts against a plane surface 55 of flange 50, perpendicular to the generating lines of the cylindrical portion 49 and is positioned transversally by the outer surface of cylindrical portion 49.

Cap 48 has a threaded hole 56, coaxial to spring 39, that matches with a control device consisting of a screw 57 substantially located inside the coils of spring 39. Screw 57 has an end portion which is screwed to a cap 58 and is welded to the cap 58 or locked thereto by means of an epoxy resin adhesive.

Cap 58 has a cylindrical portion 59, with generating lines that are substantially parallel to the axis of spring 39. Portion 59 is arranged, with a small radial play, into a cylindrical hole 60 in the intermediate portion 11. Cap 58 also includes a reference portion consisting of a cylindrical flange 61 inserted in a hole 62, of the intermediate portion 11, that is coaxial to hole 60. Holes 60 and 62 are substantially coaxial to spring 39.

A plane base 63 of flange 61 can abut against a surface 64 that joins the surfaces of holes 60 and 62, while the other base 65 can abut against the internal face of wall 3.

Screw 57 can turn about its longitudinal axis but, owing to cap 58, it cannot move in a direction parallel to its longitudinal axis, with respect to portion 11 of armset 6.

Gauge 1 further includes a limiting means limiting the movement of portion 19.

Stanchion 53 has a through hole 66, with its whole longitudinal axis parallel to that of spring 39. To an end of hole 66 there is screwed the stem of screw 54, fastening stanchion 53 to portion 11, and to the other end there is screwed the stem of a screw 67. Portion 19 has a hole 68, substantially coaxial to hole 66, and including a part 69 that matches with some radial play to the stem of screw 67 and a shoulder 70 which can abut against a base 71 of the head of screw 67.

A clutch element 72, of a known type, is placed between the wall of hole 66 and the stem of screw 67 in order to prevent accidental screwing or unscrewing of the screw.

Stanchion 53 has a projecting part 73, that has substantially a prismatic shape, inserted in a groove 74 of portion 11 in order to prevent stanchion 53 from rotating with respect to portion 11, and a base 75 which provides an abutment for a first zone 45 of portion 19 as a consequence of the rotation of portion 19 about fulcrum 16.

Through wall 5, in correspondence to hole 68 there is a hole 76, tapped by a screw 77, through which it is possible to reach screw 67 from the outside of casing 2.

Gauge 1 further includes a detection means, i.e. a position transducer 78 of the differential transformer type, that has a fixed part 79 connected to portion 11 of the base element 7 of armset 6 and a movable part 80 connected to portion 19 of the armset. The fixed part 79 has a primary and two secondary windings of the differential transformer, while the movable part 80 has a magnetic core that is movable with respect to the windings.

A cable 81 connects the windings of transducer 78 to a power supply, processing and display unit, not shown in the drawings. Cable 81 passes through cable-clamp 18 that clamps it with respect to armset 6 thereby preventing any electric wire connections between the power supply, processing and display unit and the windings of the differential transformer from being torn.

Cable-clamp 18, a sealing gasket 82, a washer 83 and a nut 84, that matches with cable-clamp 18, seal the opening of casing 2 adjacent to wing 13. Rubber gaskets 85 and 86, or gaskets made of a soft metal, for example aluminum or copper, are placed between screws 47 and 77 and wall 5 in order to seal holes 46 and 76.

A gasket 87 and a resilient membrane 88 are placed between gauging arm 23 and the internal faces of casing 2, in order to make the gauge sealtight.

With reference to FIG. 3, gauge 1 operates in the following way.

Compression spring 39 pushes portion 19, and keeps a second zone, i.e. shoulder 70 of portion 19 in touch with base 71 of the head of screw 67, which acts as a stop. Under this circumstance feeler 24 that is connected to portion 19 by means of arm 23, is displaced an amount, or "interference", "S", with respect to the level of a surface 89 of piece 90 to be checked.

When piece 90 is displaced towards gauge 1, or the gauge is displaced towards the piece, an edge 91 touches feeler 24 and gives rise to a clockwise rotation of arm 23, and of portion 19, about fulcrum 16, thereby enabling the feeler to contact surface 89. Should interference "S" have an excessive value, the impact of edge 91 against feeler 24 or arm 23 could damage the feeler or armset 6.

In gauge 1, interference "S" can be adjusted even after armset 6 has been inserted in casing 2, by unscrewing screw 77 and using a screwdriver to adjust screw 67. By screwing or unscrewing screw 67 it is possible to move base 71. Base 71, by means by shoulder 70, causes a clockwise or counter-clockwise rotation of portion 19 and of arm 23 about fulcrum 16 thereby adjusting the rest position of feeler 24 and consequently interference "S".

The amplitude of the clockwise rotation of arm 23 is defined by the contacting of portion 19 with base 75 of stanchion 53 and that of the counter-clockwise rotation by the contacting between base 71 and shoulder 70. The amplitude of these displacements is usually small so that the movement of feeler 24 can practically be considered as a translation along a direction perpendicular to the axis of casing 2.

The rotations of arm 23 and of portion 19 cause variations in the output signal of transducer 78. The value of this output signal when feeler 24 contacts surface 89, is responsive to the deviation of the dimension of piece 90 from a known value, with respect to which gauge 1 is zeroset in a known way.

The force that spring 39 applies to portion 19, and therefore that which feeler 24 applies to the piece to be checked, can be adjusted by operating adjustment device 42 in the following way.

By unscrewing screw 47, and by using a screwdriver it is possible to reach screw 57 of the adjustment device 42, by passing through holes 44 and 46. By turning screw 57, cap 48, that cannot turn because lateral plane surface 51 abuts against lateral face 52 of stanchion 53, is forced to screw onto screw 57 and to translate in a direction that is parallel to the axis of spring 39. The translation of cap 48 causes a variation in the axial distance between end 41, that contacts base 55 of flange 51, and end 40 that cannot move because it is in contact with portion 19, that is in turn urged by spring 39 against base 71 of screw 77. The adjustment of the distance of ends 40 and 41 enables adjusting the force applied by spring 39 to portion 19 and consequently the force applied by feeler 24 to the pieces to be checked. As it is known, the variation in the axial length of a helical spring causes a variation in the resilient force applied by the spring that is proportional to the actual variation in length.

The limits in the adjustment range of device 42 are determined by the contacting of flange 50 with portion 11 and the cylindrical portion 49 with the head of screw 57.

An important feature of the gauge consists in its limited height dimensions owing to the use of an armset 6 made of flat sheet steel and to the arrangement inside of the space defined by the armset of both the means (53 and 67) to limit and adjust the movements of arm 23 and device 42 for adjusting the force applied by spring 39.

A further important feature consists in the possibility of adjusting spring 39 without causing its torsion.

Yet another important feature consists in the use of connection means, for connecting the adjustment device 42 with stanchion 53 of the bent sheet steel armset, that need only simple and inexpensive machining such as, for example, piercing.

An advantage of the gauge consists in the possibility of inserting inside tubular casing 2 armset 6, when already equipped with its adjustment device 42, stanchion 53 and its associated screw 67 to adjust interference "S", and position transducer 78, simply by entering it from one end of the casing.

A further advantage consists in the possibility of reaching adjustment device 42 and screw 67 directly from the outside of the gauge without having to slide out armset 6 from tubular casing 2.

It will be obvious to those skilled in the art that changes and modifications may be made without departing from the scope of this invention in its broader aspects.

What is claimed is:

1. A gauge for the dimensional checking of mechanical pieces, comprising: support means including an outer support casing and an elongated support element arranged in a longitudinal direction within the casing, the support element being fastened to the casing and defining a longitudinal axis; a gauging arm connected to the support element for rotational measurement displacements, substantially about an axis perpendicular to said longitudinal axis; detection means having elements coupled to the support element and the gauging arm for detecting the position of the gauging arm; and limiting means for limiting in an adjustable way the displacements of the gauging arm, said limiting means including a member fixed to the support element and having an abutment surface adapted to abut against a first zone of the gauging arm to limit displacements along a first direction and an adjustable element fixed to the member for adjustment in a direction substantially perpendicular to the longitudinal axis and to said axis perpendicular to the longitudinal axis, this adjustable element having an abutment surface adapted to cooperate with a second zone of the gauging arm opposite to the first zone, in order to limit the gauging arm displacements in the opposite direction with respect to the first.

2. The gauge according to claim 1, wherein the support casing includes a tubular casing with a cross-section with external and internal rectangular, or square, perimeters and with a geometrical axis that is substantially parallel to said longitudinal axis defined by the support element, the gauging arm including a first element made of bent sheet steel housed within the tubular casing, said adjustable element of the limiting means passing through a hole in the bent sheet steel element.

3. The gauge according to claim 2, wherein said adjustable element of the limiting means includes a screw matched to a threaded hole of said member, the screw having a head that defines said abutment surface adapted to cooperate with the second zone of the gauging arm.

4. The gauge according to claim 3, wherein said limiting means include a clutch element placed between the screw and said member, in order to prevent the screw from accidentally rotating.

5. The gauge according to claim 1, further including a feeler fixed to an end of the gauging arm in order to touch the piece to be checked; a helical spring in abutment with the gauging arm in order to provide the contact force applied by the feeler to the piece; and an adjustment device to adjust the force applied by the spring, the spring defining a geometrical axis parallel to the direction substantially perpendicular to the longitudinal axis and having an end cooperating with the gauging arm, the adjustment device being coupled to the support element and having a movable element that cooperates with the second end of the spring, wherein the adjustment device includes a control device coupled to the movable element of the adjustment device and that can rotate about an axis substantially coincident with the geometrical axis defined by the spring, the movable element of the adjustment device and said member having surfaces adapted to cooperate with each other in order to prevent the rotation of the movable element of the adjustment device.

6. The gauge according to claim 2, wherein said elongated support element is made of bent sheet steel and is fixed to an internal face of the tubular casing.

7. The gauge according to claim 3, wherein said member has a base adapted to cooperate with said first bent sheet steel element of the gauging arm to define the abutment surface of the member, the tubular casing having a hole to provide access to the screw of the limiting means.

8. The gauge according to claim 2, wherein the support element includes a second element made of bent sheet steel fixed to an internal face of the tubular casing and wherein the limiting means include a screw adapted to fix the member to said second bent sheet steel element, the member and the second bent sheet steel element having surfaces adapted to prevent the member from rotating with respect to the second bent sheet steel element.

9. A gauge for the dimensional checking of mechanical pieces, comprising:

support means including an outer support casing and an elongated support element arranged in a longitudinal direction within the casing;

fastening means for fastening the support element to the support casing;

a gauging arm partially arranged within the support casing, the gauging arm being coupled to the support element for rotational measurement displacements about an axis perpendicular to said longitudinal direction;

detection means having two elements coupled to the gauging arm and the support element, respectively, for detecting the position of the grouping arm; and limiting means for limiting the displacements of the gauging arm, the limiting means including: a member fixed to the support element and having an abutment surface providing an abutment for the gauging arm, for limiting the gauging arm displacements in a first direction of said rotational displacements; and an abutment element adjustably coupled to said member for adjustment in a direction substantially perpendicular to said longitudinal direction, the abutment element having an abutment surface for limiting the gauging arm displacements in the direction of said rotational displacements opposite to the first direction, and wherein the support element, the gauging arm, the detection means and the limiting means define an armset fastened to the outer support casing by said fastening means.

10. A gauge for the dimensional checking of mechanical pieces, comprising:

an outer tubular support casing;

an elongated support element arranged in a longitudinal direction within the tubular casing;

fastening means for fastening the support element to the wall of the tubular casing;

a gauging arm partially arranged within the tubular casing, the gauging arm being coupled to the support element for rotational displacements about an axis perpendicular to said longitudinal direction;

a feeler for touching the mechanical piece to be checked, the feeler being coupled at an end of the gauging arm outside the tubular casing;

a position transducer having a first element coupled to the gauging arm and a second element coupled to the support element;

a spring means arranged between the gauging arm and the support element for causing rotational displacements of the gauging arm in a first direction and contact of the feeler with the piece to be checked; and stop means for limiting the displacements of the gauging arm, the stop means including: a member fixed to the support element and defining an abutment surface providing a fixed abutment for limiting the rotational displacements of the gauging arm in the direction opposite to said first direction; and a screw adjustably coupled to said member for adjustment in a direction substantially perpendicular to said longitudinal direction, the screw passing through a hole in the gauging arm and having a head defining an abutment surface for adjustably limiting the gauging arm displacements in said first direction.

* * * * *